United States Patent
Horita

(10) Patent No.: US 12,061,152 B2
(45) Date of Patent: Aug. 13, 2024

(54) REPAIR DIAGRAM GENERATION DEVICE, REPAIR DIAGRAM GENERATION METHOD, AND PROGRAM

(71) Applicant: FUJIFILM Corporation, Tokyo (JP)

(72) Inventor: Shuhei Horita, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 260 days.

(21) Appl. No.: 17/566,311

(22) Filed: Dec. 30, 2021

(65) Prior Publication Data

US 2022/0120696 A1 Apr. 21, 2022

Related U.S. Application Data

(63) Continuation of application No. PCT/JP2020/021902, filed on Jun. 3, 2020.

(30) Foreign Application Priority Data

Jul. 25, 2019 (JP) .................................. 2019-136758

(51) Int. Cl.
*G01N 21/88* (2006.01)
*G06T 7/00* (2017.01)

(52) U.S. Cl.
CPC ....... *G01N 21/8851* (2013.01); *G06T 7/0004* (2013.01); *G01N 2021/8854* (2013.01)

(58) Field of Classification Search
CPC ........ G01N 21/8851; G01N 2021/8854; G06T 7/0004; G06T 2200/24; G06T 2207/20096;
(Continued)

(56) References Cited

U.S. PATENT DOCUMENTS

| 2004/0218806 A1* | 11/2004 | Miyamoto | .............. G06F 18/40 382/145 |
| 2011/0050880 A1* | 3/2011 | Bourg, Jr. | ................. G06T 7/90 382/110 |

(Continued)

FOREIGN PATENT DOCUMENTS

| JP | 2002-222281 A | 8/2002 |
| JP | 2014-095565 A | 5/2014 |
| JP | 2017-167969 A | 9/2017 |
| JP | 2019-057192 A | 4/2019 |

OTHER PUBLICATIONS

An Office Action; "Decision of Refusal," mailed by the Japanese Patent Office on Aug. 2, 2023, which corresponds to Japanese Patent Application No. 2021-534578 and is related to U.S. Appl. No. 17/566,311; with English language translation.
(Continued)

*Primary Examiner* — Isiaka O Akanbi
(74) *Attorney, Agent, or Firm* — Studebaker & Brackett PC

(57) ABSTRACT

Provided are a repair diagram generation device, a repair diagram generation method, and a program which accurately and efficiently generate a repair diagram showing a repair region to be repaired and a repair method from a captured image of a structure. A repair diagram generation device includes an image acquisition unit that acquires a captured image of a structure, a damage detection unit that detects damage from the captured image by image processing and specifies a degree of the damage, a method specifying unit that specifies a repair method of the damage based on the damage and the degree of the damage, and a repair diagram generation unit that generates a repair diagram showing a repair region and the repair method for repairing the damage based on the damage and the repair method.

15 Claims, 17 Drawing Sheets

(58) Field of Classification Search
CPC . G06T 7/62; G06T 2207/30132; G06Q 10/20; G06Q 30/0283; G06Q 50/08; G01M 5/0033; G01M 5/0091
USPC .............................................. 356/237.2, 601
See application file for complete search history.

(56) References Cited

U.S. PATENT DOCUMENTS

| | | | |
|---|---|---|---|
| 2014/0208163 A1* | 7/2014 | Domke | G05B 23/0208 |
| | | | 714/37 |
| 2018/0189423 A1* | 7/2018 | Nonaka | G06Q 10/06316 |
| 2018/0189750 A1* | 7/2018 | Nonaka | G06T 7/0004 |
| 2020/0349695 A1* | 11/2020 | Horita | G01N 21/892 |

OTHER PUBLICATIONS

An Office Action mailed by the Japanese Patent Office on Mar. 7, 2023, which corresponds to Japanese Application No. 2021-534578 with English translation.

The extended European search report issued by the European Patent Office on Aug. 30, 2022, which corresponds to European Patent Application No. 20843520.6-1001 and is related to U.S. Appl. No. 17/566,311.

International Search Report issued in PCT/JP2020/021902; mailed Aug. 8, 2020.

International Preliminary Report on Patentability and Written Opinion issued in PCT/JP2020/021902; issued Jan. 25, 2022.

* cited by examiner

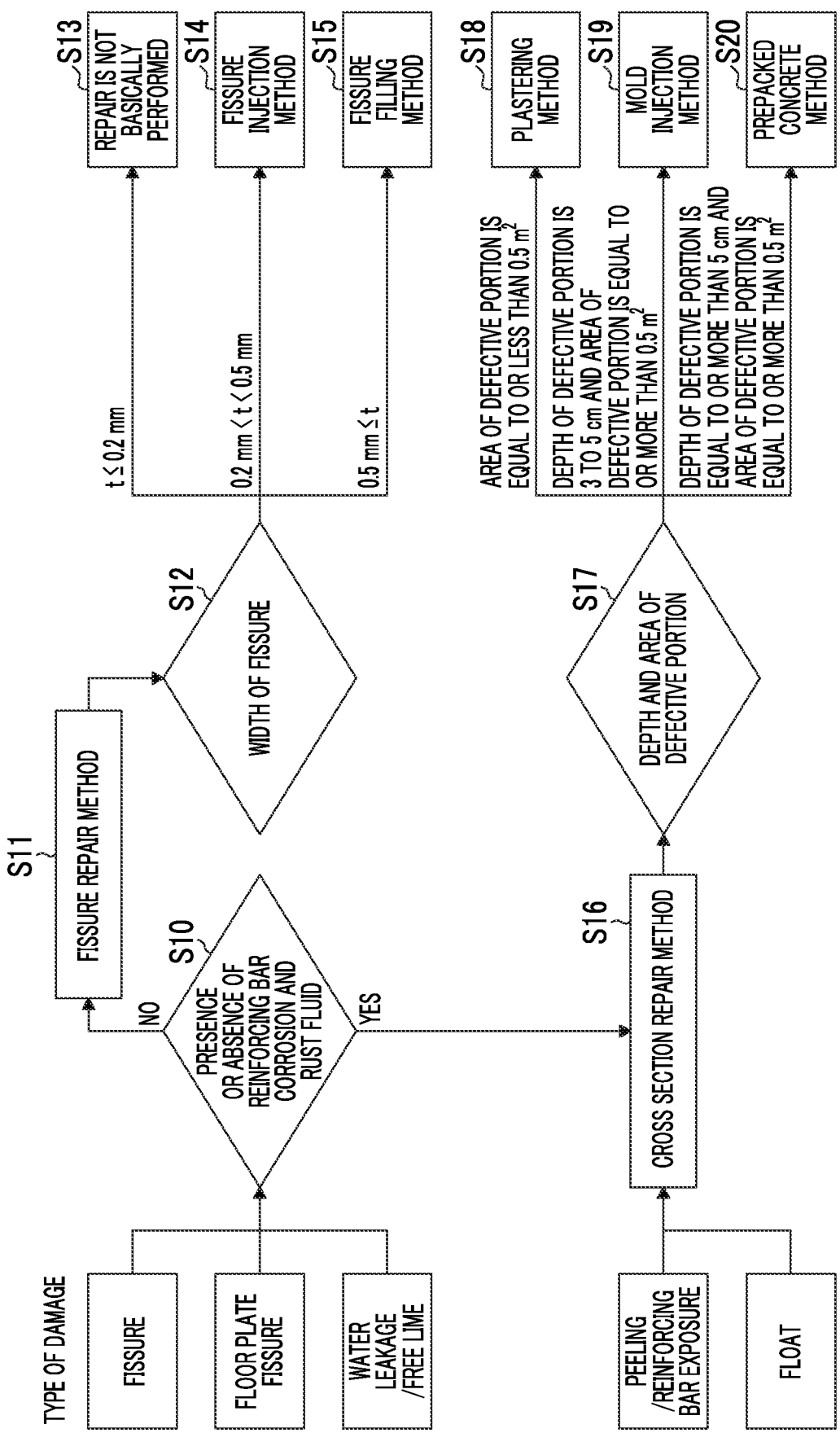

FIG. 6A
FIG. 6B
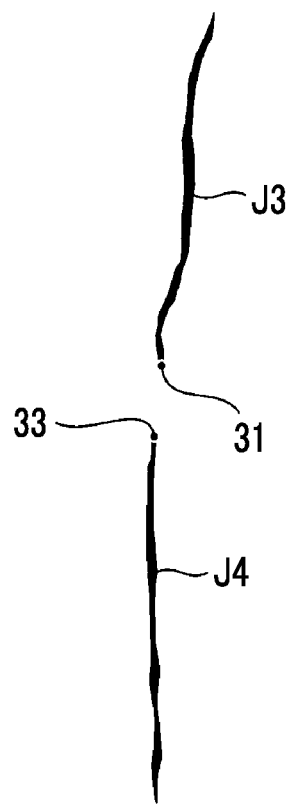

| REPAIR ID | TYPE OF REPAIR METHOD | SIZE (WIDTH mm) | SIZE (LENGTH mm) | SIZE (AREA m²) |
|---|---|---|---|---|
| A1 | FISSURE REPAIR METHOD (FISSURE FILLING METHOD) | 0.60 | 2550 | - |
| A2 | FISSURE REPAIR METHOD (FISSURE INJECTION METHOD) | 0.30 | 3100 | - |
| D1 | CROSS SECTION REPAIR METHOD (MOLD INJECTION METHOD) | - | - | 1.2 |

FIG. 12

| MAJOR REPAIR METHOD CLASSIFICATION | MINOR REPAIR METHOD CLASSIFICATION | UNIT REPAIR COST |
|---|---|---|
| FISSURE REPAIR METHOD | FISSURE FILLING METHOD | 10,000 YEN/m |
| FISSURE REPAIR METHOD | FISSURE INJECTION METHOD | 25,000 YEN/m |
| CROSS SECTION REPAIR METHOD | PLASTERING METHOD | 50,000 YEN/$m^2$ |
| CROSS SECTION REPAIR METHOD | MOLD INJECTION METHOD | 150,000 YEN/$m^2$ |
| CROSS SECTION REPAIR METHOD | PREPACKED CONCRETE METHOD | 300,000 YEN/$m^2$ |

FIG. 13

| REPAIR ID | TYPE OF REPAIR METHOD | SIZE (WIDTH mm) | SIZE (LENGTH mm) | SIZE (AREA $m^2$) | REPAIR COST |
|---|---|---|---|---|---|
| A1 | FISSURE REPAIR METHOD (FISSURE FILLING METHOD) | 0.6 | 2550 | - | 63,750 YEN |
| A2 | FISSURE REPAIR METHOD (FISSURE INJECTION METHOD) | 0.3 | 3100 | - | 31,000 YEN |
| D1 | CROSS SECTION REPAIR METHOD (MOLD INJECTION METHOD) | - | - | 1.2 | 180,000 YEN |

FIG. 16

| DAMAGE ID | TYPE OF DAMAGE | SIZE (WIDTH mm) | SIZE (LENGTH mm) | SIZE (AREA m$^2$) |
|---|---|---|---|---|
| C1 | FISSURE | 0.55 | 1800 | - |
| C2 | FISSURE | 0.60 | 700 | - |
| C3 | FISSURE | 0.30 | 2000 | - |
| C4 | FISSURE | 0.25 | 1000 | - |
| C5 | FISSURE | 0.10 | 1500 | - |
| H1 | PEELING | - | - | 0.85 |

REPAIR DIAGRAM GENERATION DEVICE, REPAIR DIAGRAM GENERATION METHOD, AND PROGRAM

CROSS-REFERENCE TO RELATED APPLICATIONS

This application is a Continuation of PCT International Application No. PCT/JP2020/021902 filed on Jun. 3, 2020, which claims priority under 35 U.S.C § 119(a) to Japanese Patent Application No. 2019-136758 filed on Jul. 25, 2019. Each of the above application(s) is hereby expressly incorporated by reference, in its entirety, into the present application.

BACKGROUND OF THE INVENTION

1. Field of the Invention

The present invention relates to a repair diagram generation device, a repair diagram generation method, and a program, and more particularly to a repair diagram generation device, a repair diagram generation method, and a program which generate a repair diagram from a captured image obtained by imaging a structure.

2. Description of the Related Art

In the related art, the technology is used in which a captured image of a structure, which is an inspection target, is acquired and damage, such as a fissure, is detected based on the captured image.

For example, JP2002-222281A discloses the technology for imaging a structure, detecting a defect from the captured image of the structure, and easily and accurately calculating a cost for repairing the defect. In the technology disclosed in JP2002-222281A, the captured image of an evaluation object is acquired, and the number, a type, and a size of damages present in the captured image are detected by a method, such as pattern extraction. Further, a repair cost is calculated based on the number, the type, and the size of the detected damages.

SUMMARY OF THE INVENTION

However, in the technology disclosed in JP2002-222281A, the repair cost is calculated based on the size of the detected damage, but an actual repair size and the detected damage size may be different. For example, in a case in which a peeled portion of a concrete wall is repaired, the repair may be performed including a peripheral portion of the peeled portion.

In addition, a repair work plan or a pre-repair survey report may be created by using the repair diagram that actually shows the repair region and repair method, and in that case, it is necessary to generate the repair diagram. However, in the technology disclosed in JP2002-222281A, the repair diagram showing the repair region and the repair method is not generated, and thus, for example, a user needs to manually generate the repair diagram.

The present invention has been made in view of such circumstances, and is to provide a repair diagram generation device, a repair diagram generation method, and a non-transitory computer readable recording medium storing a program which accurately and efficiently generate a repair diagram showing a repair region to be repaired and a repair method from a captured image of a structure.

In order to achieve the object, an aspect of the present invention relates to a repair diagram generation device comprising an image acquisition unit that acquires a captured image of a structure, a damage detection unit that detects damage from the captured image by image processing and specifies a degree of the damage, a method specifying unit that specifies a repair method of the damage based on the damage and the degree of the damage, and a repair diagram generation unit that generates a repair diagram showing a repair region and the repair method for repairing the damage based on the damage and the repair method.

According to the aspect, the damage detection unit detects the damage and specifies the degree of the damage. Further, in the aspect, the repair method of the damage is specified based on the damage and the degree of the damage, and the repair diagram showing the repair region and the repair method for repairing the damage based on the damage and the repair method is accurately and efficiently generated.

It is preferable that in a case in which the damage is a plurality of fissures in the captured image and the plurality of fissures are close to each other by equal to or less than a threshold value, the repair diagram generation unit generate the repair diagram by connecting the fissures close to each other.

It is preferable that the repair diagram generation unit generate the repair diagram by using a region larger than a shape of the damage as the repair region.

It is preferable that the repair diagram generation device further comprise a repair calculation unit that calculates a size of the repair region based on the repair diagram, and a repair quantity table generation unit that generates a repair quantity table including the size of the repair region.

It is preferable that the repair diagram generation device further comprise a repair cost calculation unit that calculates a repair cost of the damage based on the size of the repair region and the repair method.

It is preferable that the repair diagram generation device further comprise a first display control unit that displays at least one of the repair diagram, the repair quantity table, or the repair cost as a first detection result on a display unit.

It is preferable that the repair diagram generation device further comprise a damage diagram generation unit that generates a damage diagram showing the damage based on the damage.

It is preferable that the repair diagram generation device further comprise a damage quantity table generation unit that generates a damage quantity table including the degree of the damage.

It is preferable that the repair diagram generation device further comprise a second display control unit that displays at least one of the damage diagram or the damage quantity table as a second detection result on the display unit.

It is preferable that the first display control unit and the second display control unit switch and display the first detection result and the second detection result.

It is preferable that the first display control unit and the second display control unit display the first detection result and the second detection result side by side at the same time.

It is preferable that the repair diagram generation device further comprise a first editing reception unit that receives an editing instruction for the first detection result.

It is preferable that the repair diagram generation device further comprise a second editing reception unit that receives an editing instruction for the second detection result.

It is preferable that the image acquisition unit acquires a plurality of captured images of the structure, and that the repair diagram generation device further comprise a panorama composition unit that performs panorama composition of the plurality of the captured images acquired by the image acquisition unit.

Another aspect of the present invention relates to a repair diagram generation method comprising an image acquisition step of acquiring a captured image of a structure, a damage detection step of detecting damage from the captured image by image processing and specifying a degree of the damage, a method specifying step of specifying a repair method of the damage based on the damage and the degree of the damage, and a repair diagram generation step of generating a repair diagram showing a repair region and the repair method for repairing the damage based on the damage and the repair method.

Still another aspect of the present invention relates to a non-transitory computer readable recording medium storing a program causing a computer to execute a repair diagram generation process comprising an image acquisition step of acquiring a captured image of a structure, a damage detection step of detecting damage from the captured image by image processing and specifying a degree of the damage, a method specifying step of specifying a repair method of the damage based on the damage and the degree of the damage, and a repair diagram generation step of generating a repair diagram showing a repair region and the repair method for repairing the damage based on the damage and the repair method.

In the present invention, the damage is detected by the damage detection unit and the degree of the damage is specified by the damage detection unit, the repair method of the damage is specified based on the damage and the degree of the damage, and the repair diagram showing the repair region and the repair method for repairing the damage based on the damage and the repair method is accurately and efficiently generated

BRIEF DESCRIPTION OF THE DRAWINGS

FIG. 5 is a flowchart showing an example of a repair method selection process.

FIGS. 6A and 6B are diagrams each describing an example in a case in which a repair diagram of a fissure is created.

FIG. 12 is a diagram showing a storage configuration example of a repair cost database.

FIG. 13 is a diagram showing a modification example of the repair quantity table.

FIG. 16 is a diagram showing a damage quantity table.

DESCRIPTION OF THE PREFERRED EMBODIMENTS

Hereinafter, preferred embodiments of a repair diagram generation device, a repair diagram generation method, and a program according to embodiments of the present invention will be described with reference to the accompanying drawings.

Figure 1:
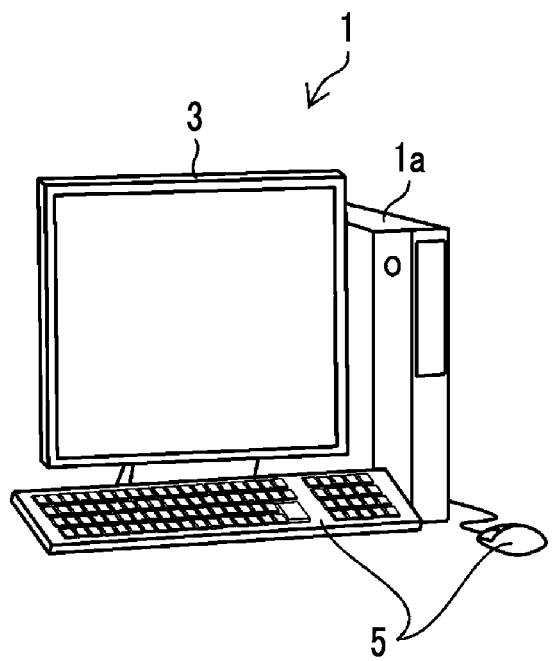
FIG. 1 is a conceptual diagram showing a computer equipped with a repair diagram generation device.

FIG. 1 is a conceptual diagram showing a computer 1 equipped with a repair diagram generation device 10 (see FIG. 4) according to the embodiment of the present invention. The computer 1 includes a computer body 1*a*, a display unit 3, and an operation unit 5.

The display unit 3 is configured by various monitors, such as a liquid crystal monitor that can be connected to the computer 1. The display unit 3 displays a captured image obtained by imaging a structure. In addition, the display unit 3 displays at least one of a repair diagram, a repair quantity table, or a repair cost as a first detection result. In addition, the display unit 3 displays at least one of a damage diagram or a damage quantity table as a second detection result.

The operation unit 5 is configured by a keyboard, a mouse, and the like that are connected to the computer 1 by wire connection or wireless connection. A user confirms the first and second detection results displayed on the display unit 3, performs an input of a correction and the like via the operation unit (first editing reception unit and second editing reception unit) 5, and performs a correction or a change of the first and second detection results.

Figure 2:
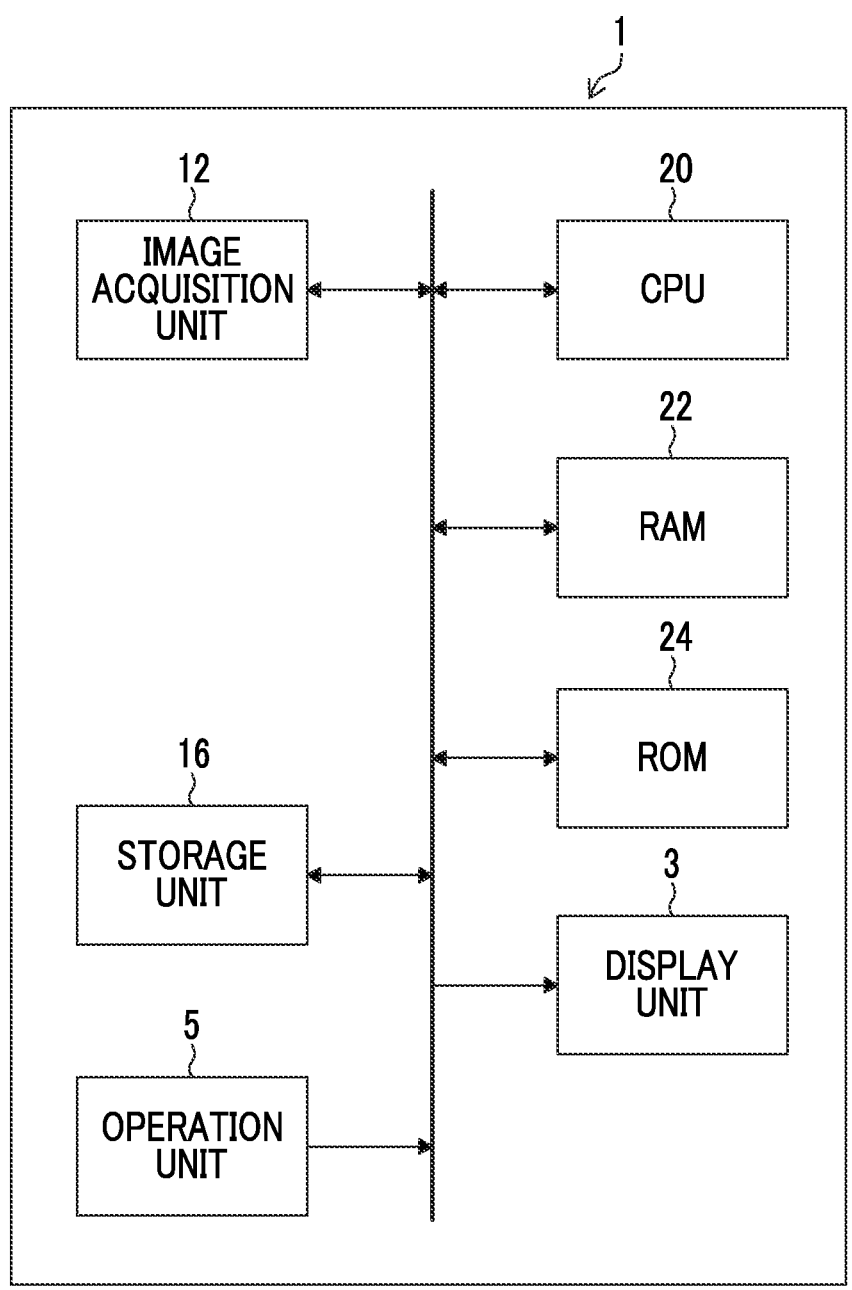
FIG. 2 is a block diagram showing an example of a hardware configuration of the computer.

FIG. 2 is a block diagram showing an example of a hardware configuration of the computer 1.

The hardware configuration of the computer 1 is mainly configured by an image acquisition unit 12, a storage unit 16, an operation unit 5, a central processing unit (CPU) 20, a random access memory (RAM) 22, and a read only memory (ROM) 24, and the display unit 3.

The image acquisition unit 12 corresponds to an input/output interface, and in the present embodiment, the captured image captured by a camera (not shown) is acquired wirelessly or by wire. The camera acquires the captured image of the structure, which is an inspection target. The image acquisition unit 12 may acquire the captured image which is a divided image obtained by dividing and imaging the structure, which is the inspection target, or may acquire the captured image in which the structure is contained in one image. Examples of the structure, which is the inspection target, include a building, a bridge, and a tunnel.

Figure 3:
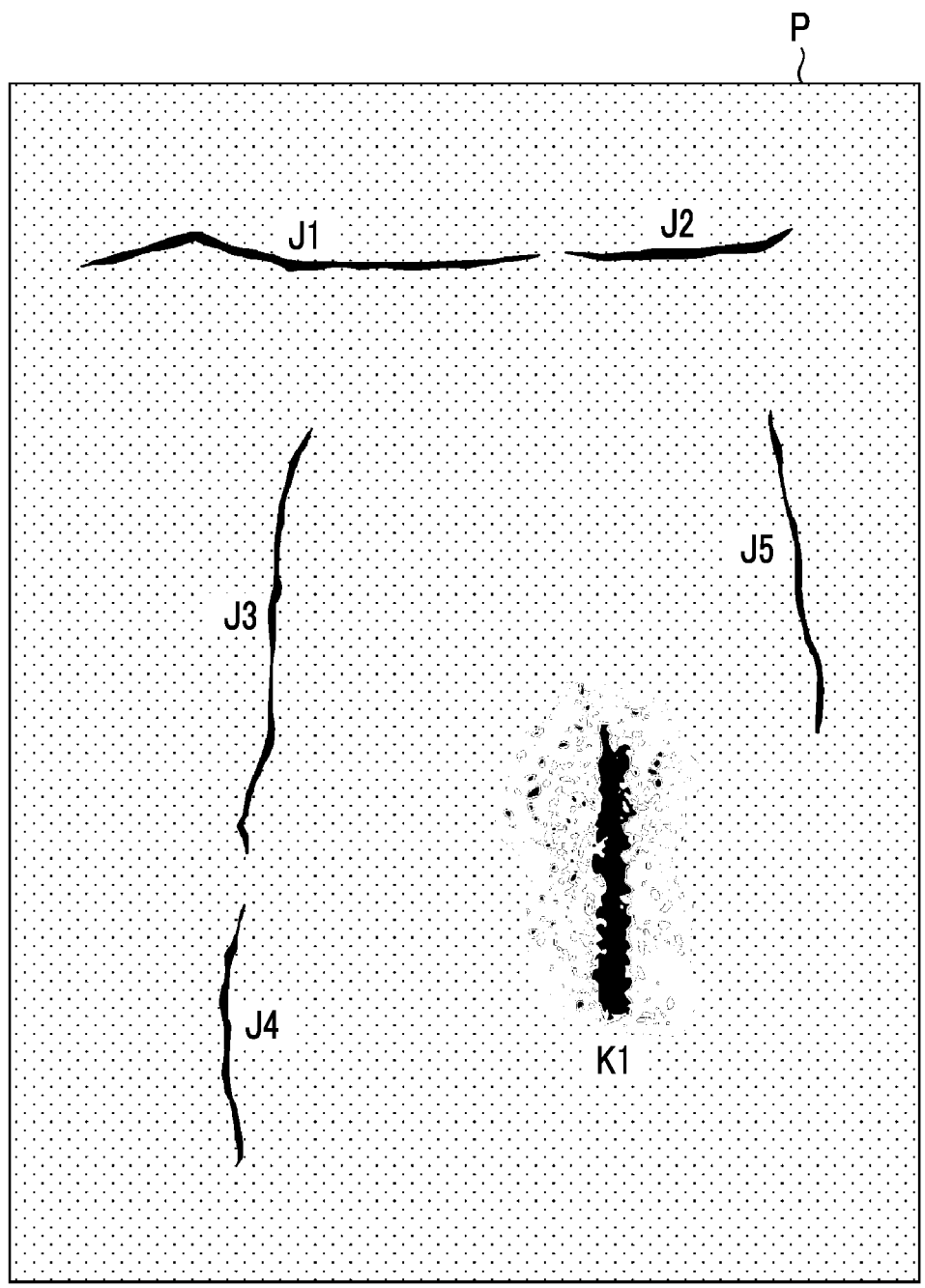
FIG. 3 is a diagram schematically showing a captured image.

FIG. 3 is a diagram schematically showing the captured image obtained by imaging a part of the bridge as the structure, which is the inspection target, acquired by the image acquisition unit 12. A captured image P shows fissures J1 to J5 and peeling K1.

The storage unit 16 is the storage unit 16 configured by a hard disk apparatus, a flash memory, and the like, and stores programs for causing the repair diagram generation device 10 to function, such as an operating system, a damage detection program, a repair diagram generation program, a repair method selection program, a repair quantity table generation program, a database for calculating the repair cost, a damage diagram generation program, and a damage quantity table generation program. Note that the various programs may be recorded and distributed on an external recording medium (not shown) and installed by the CPU 20 from the recording medium. Alternatively, the various programs may be stored in a server or the like connected to a network in a state of being accessible from the outside, downloaded to the storage unit 16 by the CPU 20 in response to a request, installed, and executed.

The CPU 20 reads out various programs stored in the storage unit 16 or the ROM 24 or the like, and controls respective units in an integrated manner. In addition, the CPU 20 executes various pieces of processing of generating the first detection result (the repair diagram, the repair quantity table, or the repair cost), and various pieces of processing of generating the second detection result (damage diagram or damage quantity table), which will be described below.

The RAM 22 is used as a work region of the CPU 20, and is used as a storage unit that transitorily storing the readout programs or various data.

First Embodiment

Hereinafter, the repair diagram generation device 10 according to a first embodiment of the present invention will be described.

Figure 4:
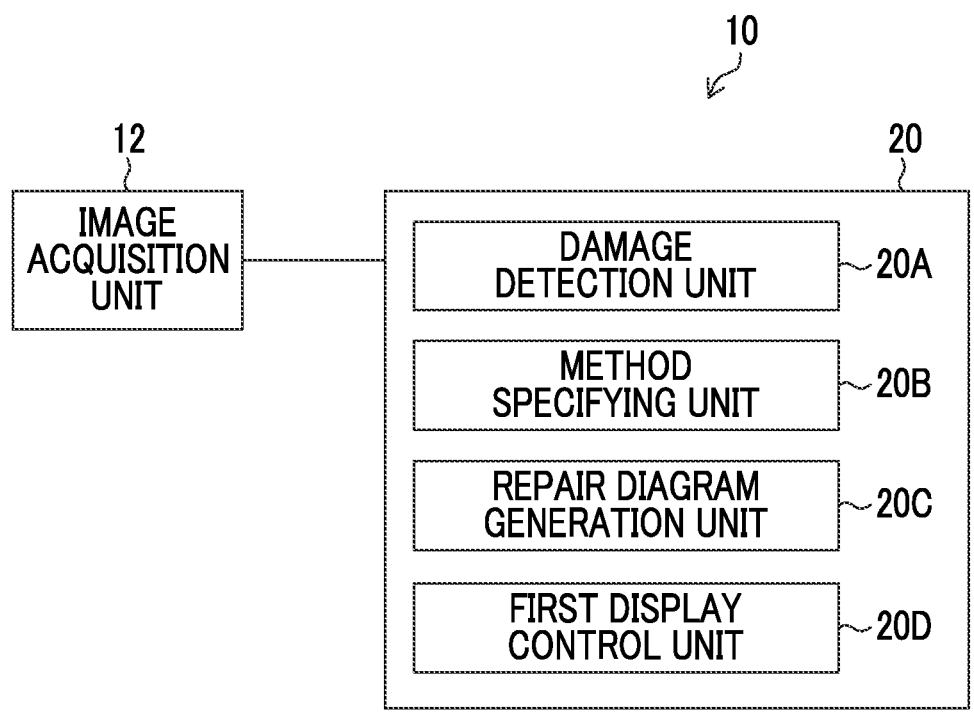
FIG. 4 is a block diagram showing a main configuration example of the repair diagram generation device.

FIG. 4 is a block diagram showing a main configuration example of the repair diagram generation device 10 according to the present embodiment.

The repair diagram generation device 10 mainly comprises the image acquisition unit 12 and the CPU 20. The CPU 20 according to the present embodiment executes various programs stored in the storage unit 16 or the ROM 24, so that the CPU 20 functions as a damage detection unit 20A, a method specifying unit 20B, a repair diagram generation unit 20C, and a first display control unit 20D.

The damage detection unit 20A detects the damage from the captured image by image processing and specifies a degree of the detected damage. The damage detection unit 20A is constructed in accordance with a type of the damage to be detected. For example, the damage detection unit 20A is constructed by an artificial intelligence (AI) detector subjected to machine learning to detect various types of the damage. Specific examples of the detector include a peeling detector, a reinforcing bar exposure detector, a water leakage detector, and a free lime detector, and the damage detection unit 20A is constructed by a single or a plurality of detectors.

The damage detection unit 20A detects the damage and specifies the degree of the detected damage. Here, the degree of the damage includes information, such as an actual length, width, area, and depth of the damage, presence or absence of reinforcing bar corrosion, and presence or absence of rust fluid, and includes items used for selection of a repair method which will be described below.

The damage detection unit 20A is constructed by a fissure detector and a peeling detector, and detects the fissures J1 to J5 and the peeling K1 from the captured image P. For example, the damage detection unit 20A detects the fissures J1 to J5 by the fissure detector, and detects the peeling K1 by the peeling detector. Further, the damage detection unit 20A specifies degrees of the fissures J1 to J5 by the fissure detector and a degree of the peeling K1 by the peeling detector.

The damage detection unit 20A outputs the type of damage and the degree of the damage to the method specifying unit 20B.

The method specifying unit 20B specifies the damage repair method based on the detected damage. Specifically, the method specifying unit 20B selects the damage repair method in accordance with the damage and the degree of the damage by using the repair method selection program stored in the storage unit 16.

FIG. 5 is a flowchart showing an example of a repair method selection process. Note that FIG. 5 is a flowchart taken from a bridge repair and reinforcement manual (Civil Engineering Department, Nagasaki Prefecture).

First, in the method specifying unit 20B, in a case in which the damage detected by the damage detection unit 20A is "fissure", "floor plate fissure", or "water leakage/free lime", the damage detection unit 20A determines whether or not the presence or absence of the reinforcing bar corrosion and the rust fluid is detected (step S10). Further, in a case in which there are no reinforcing bar corrosion and rust fluid, the method specifying unit 20B selects that the repair is performed by a fissure repair method (step S11). Next, the method specifying unit 20B determines the width of the fissure (step S12). The method specifying unit 20B selects that the repair is not basically performed in a case in which a width t of the fissure detected by the damage detection unit 20A is t≤0.2 mm (step S13). In addition, the method specifying unit 20B selects a fissure injection method in a case in which the width t of the fissure is 0.2 mm<t<0.5 mm (step S14). In addition, the method specifying unit 20B selects a fissure filling method in a case in which the width t of the fissure is 0.5 mm≤t (step S15).

Here, the fissure injection method is a method for cutting concrete along the fissure and injecting a repair material at a predetermined injection pressure by using a dedicated jig. In addition, the fissure filling method is a method for cutting the concrete along the fissure and filling the portion with the repair material.

On the other hand, in a case in which the type of the damage detected by the damage detection unit 20A is "peeling/reinforcing bar exposure" or "float", in a case in which the type of the damage is "fissure", "floor plate fissure", or "water leakage/free lime" and the reinforcing bar corrosion and the rust fluid are present, the method specifying unit 20B selects a cross section repair method (step S16). Next, the method specifying unit 20B determines a depth and an area of a defective portion detected by the damage detection unit 20A (step S17). The method specifying unit 20B selects a plastering method in a case in which the area of the defective portion is equal to or less than 0.5 m$^2$ (step S18). In addition, the method specifying unit 20B selects a mold injection method in a case in which the depth of the defective portion is 3 cm to 5 cm and the area of the defective portion is equal to or more than 0.5 m$^2$ (step S19). In addition, the method specifying unit 20B selects a prepacked concrete method in a case in which the depth of the defective portion is equal to or more than 5 cm and the area of the defective portion is equal to or more than 0.5 m$^2$ (step S20).

Here, the plastering method is a method for applying a cross section restorative material, the mold injection method is a method for installing a mold and injecting an injection material, and the prepacked concrete method is a method for repairing by using concrete that is made by first putting coarse aggregate into the mold and then injecting and filling mortar.

Note that the repair method selection process described with reference to FIG. 5 is one of specific examples, and the selection of the repair method is not limited to this, and various repair method selections can be used. In addition, information necessary for selecting the repair method is acquired from the input via the damage detection unit 20A or the operation unit 5 of the user.

Returning to FIG. 4, the repair diagram generation unit 20C generates the repair diagram showing a repair region and the repair method for repairing the damage based on the detected damage and the repair method. The repair diagram generation unit 20C generates the repair diagram by various methods. For example, the repair diagram generation unit 20C generates the repair diagram of each damage from the captured image P by a repair diagram generator subjected to machine learning. That is, in this case, the repair diagram generation unit 20C directly generates the repair diagram from the captured image P. In addition, the repair diagram generation unit 20C generates the repair diagram of the detected damage by performing predetermined processing on the damage detected from the captured image P. A specific example of the repair diagram generation will be described below. Note that the repair diagram generation unit 20C does not generate the repair diagram for the damage selected not to be repaired by the method specifying unit 20B, for example, as in step S13 described with reference to FIG. 5.

FIGS. 6A and 6B are diagrams each describing an example in a case in which a repair diagram of the fissure is created. In FIG. 6A, the fissure J3 and the fissure J4 are shown, and in FIG. 6B, a repair diagram A2 is shown. The repair diagram A2 is generated by the repair diagram generation unit 20C based on the fissure J3 and the fissure J4.

As shown in FIG. 6, an end part 31 of the fissure J3 and an end part 33 of the fissure J4 are close to each other, so that the repair diagram A2 in which the fissure J3 and the fissure J4 are combined is generated. In this way, in a case in which the fissures are close to each other, the fissures are connected to each other inside even in a case in which the fissures are not connected on the surface (on the captured image), and in this case, extra filler or the like is needed. Therefore, in a case in which the damage detected by the damage detection unit 20A is a plurality of the fissures in the captured image and the plurality of fissures are close to each other by equal to or less than a threshold value, the repair diagram generation unit 20C generates the repair diagram by connecting the fissures close to each other. As a result, it is possible for the user to obtain an accurate repair region and to appropriately prepare the filler or the like. Note that this threshold value is determined by the user based on the structure, which is the inspection target, a material of the structure, or the like. Note that in a case of combining the fissures to each other, the directionality near end of the fissure may be taken into consideration. Specifically, the repair diagram generation unit 20C combines the fissures with each other to generate the repair diagram in a case in which an angle difference of a direction vector near the end part of the fissure is equal to or less than the threshold value.

The repair diagram A2 shows that the fissure J3 and the fissure J4 are repaired by the fissure repair method. For example, the repair diagram A2 is shown by a red line, which indicates that a region of the repair diagram A2 is repaired by the fissure repair method.

Figure 7:
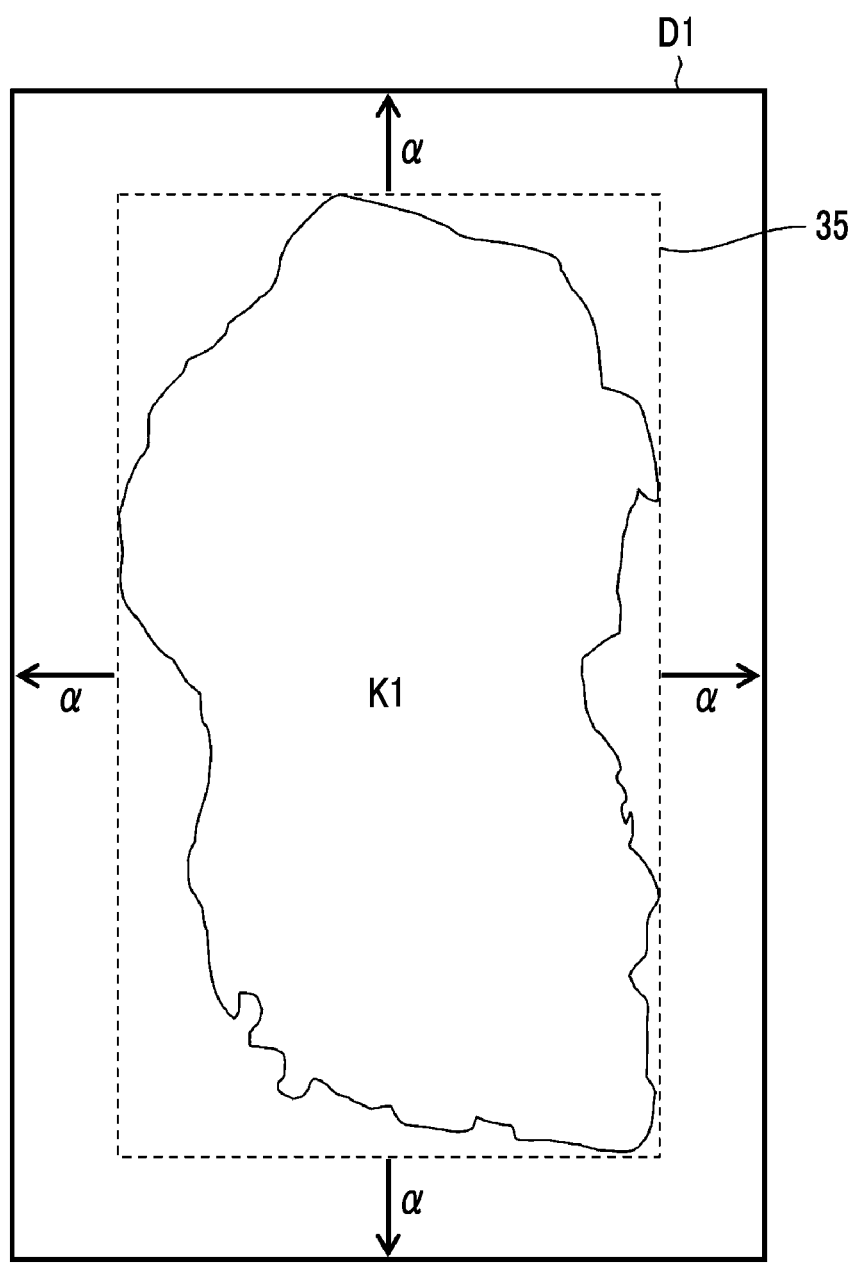
FIG. 7 is a diagram describing an example in a case in which a repair diagram of peeling is created.

FIG. 7 is a diagram describing an example in a case in which a repair diagram of the peeling K1 is created. Note that FIG. 7 shows only a region of the peeling K1.

FIG. 7 shows a damage region of the peeling K1 and a circumscribed rectangular region 35 of the shown damage region is shown by a dotted line. In a case in which the peeling K1 is repaired, the repair is performed by any method of the cross section repair methods (Cross Sectional Restoration Method), but the repaired (concrete chipping) region is larger than an actual region of the peeling K1. Therefore, the repair diagram generation unit 20C generates a repair diagram D1 as a region expanding vertically and horizontally by +a mm from the circumscribed rectangular region 35. Note that a for expanding the circumscribed rectangular region 35 is a predetermined numerical value and can be adjusted by the user. In addition, a for expanding the circumscribed rectangular region 35 may be automatically determined in accordance with the area of the damage region and the like. In this case, for example, the value of a is set to be larger as the area of the damage region is larger. Note that the repair diagram D1 is shown by, for example, a blue line, which indicates that the region of the repair diagram D1 is repaired by the cross section repair method.

Returning to FIG. 4, the first display control unit 20D displays the first detection result (at least one of the repair diagram, the repair quantity table, or the repair cost) on the display unit 3. For example, the first display control unit 20D displays the repair diagram on the display unit 3. Note that the repair quantity table and the repair cost will be described below.

Figure 8:
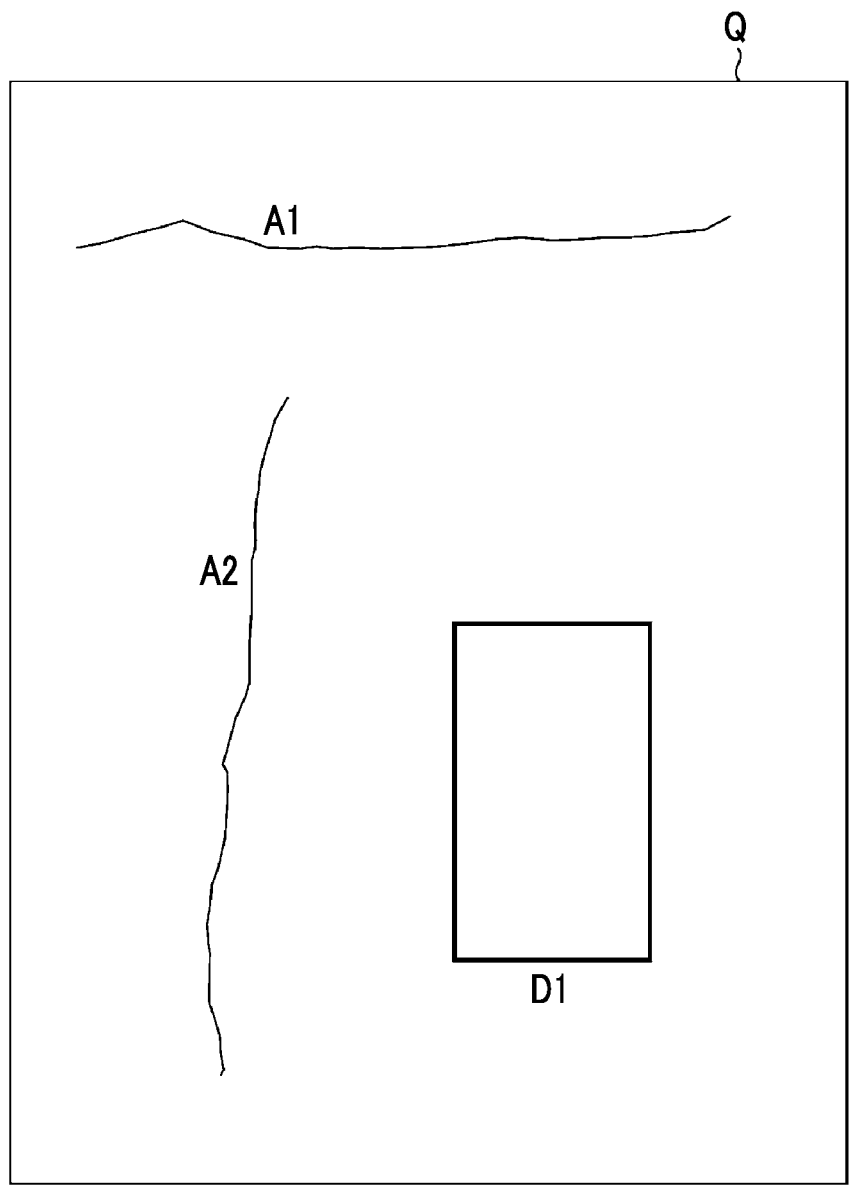
FIG. 8 is a diagram showing an example of a repair diagram.

FIG. 8 is a diagram showing an example of a repair diagram Q corresponding to the captured image P. The repair diagram Q includes a repair diagram A1, the repair diagram A2, and the repair diagram D1.

The repair diagram generation unit 20C generates the repair diagram A1 based on the fissure J1 and the fissure J2. The fissure J1 and the fissure J2 are close to each other at a distance equal to or less than the threshold value, so that one repair diagram A1 is generated. In addition, the repair diagram generation unit 20C generates the repair diagram A2 based on the fissure J3 and the fissure J4. The fissure J3 and the fissure J4 are close to each other at a distance equal to or less than the threshold value, so that one repair diagram A2 is generated. Note that the repair diagram A1 and the repair diagram A2 are shown by, for example, a red line, and are shown to be repaired by the fissure repair method.

In addition, the repair diagram generation unit 20C does not generate the repair diagram corresponding to the fissure J5. The reason is why that the width of the fissure J5 is equal to or less than the threshold value and the repair is not performed (for example, step S13 in FIG. 5), so that no repair diagram is created.

The repair diagram generation unit 20C generates the repair diagram D1 based on the peeling K1. The region shown in the repair diagram D1 is a region expanding to the outside vertically and horizontally by a mm from the circumscribed rectangular region of the peeling K1. Note that the repair diagram D1 is shown by, for example, a blue line, and is shown to be repaired by the cross section repair method.

Figure 9:
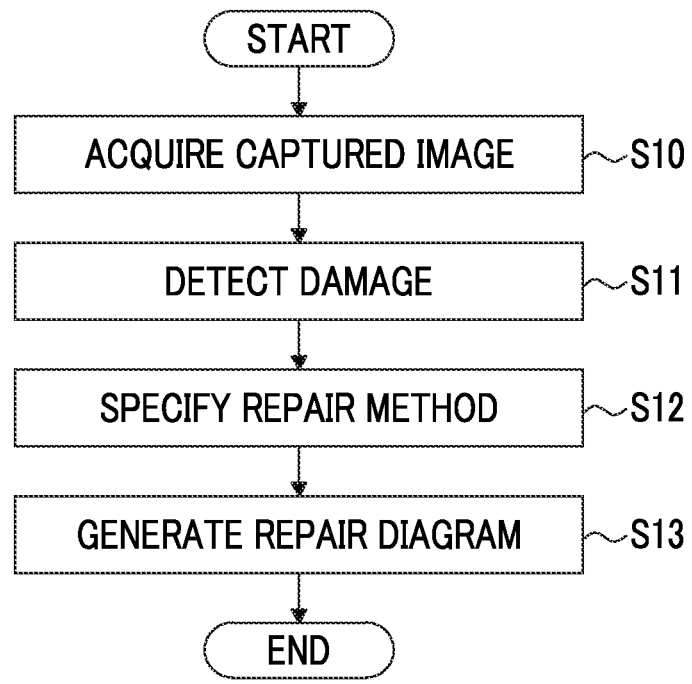
FIG. 9 is a flowchart showing a repair diagram generation method.

FIG. 9 is a flowchart showing the repair diagram generation method (repair diagram generation process) using the repair diagram generation device 10.

First, the image acquisition unit 12 acquires the captured image of the structure (image acquisition step: step S10). Thereafter, the damage detection unit 20A detects the damage from the captured image by the image processing and specifies the degree of the detected damage (damage detection step: step S11). Next, the method specifying unit 20B specifies the damage repair method (method specifying step: step S12). Thereafter, the repair diagram generation unit 20C generates the repair diagram showing the repair region for repairing the damage (repair diagram generation step: step S13).

In the embodiment described above, hardware structures of processing units (for example, the damage detection unit 20A, the method specifying unit 20B, the repair diagram generation unit 20C, the first display control unit 20D) that executes various pieces of processing are various processors as shown below. The various processors include the central processing unit (CPU) that is a general-purpose processor that executes software (program) and functioning as the various processing units, a programmable logic device (PLD) that is a processor of which a circuit configuration can be changed after manufacture, such as a field programmable gate array (FPGA), and a dedicated electric circuit that is a processor having a circuit configuration that is designed for exclusive use in order to execute specific processing, such as an application specific integrated circuit (ASIC).

One processing unit may be configured by one of these various processors, or may be two or more processors of the same type or different types (for example, a plurality of FPGAs, or a combination of the CPU and the FPGA). In addition, a plurality of the processing units may be configured by one processor. As an example of configuring a plurality of processing units with one processor, first, as represented by a computer such as a client or a server, there is a form in which one processor is configured by a combination of one or more CPUs and software, and the processor functions as a plurality of processing units. Second, as represented by a system on chip (SoC), there is a form in which a processor is used that realizes the functions of the entire system including a plurality of processing units with a single integrated circuit (IC) chip. In this way, the various processing units are configured by one or more of various processors described above as the hardware structures. Moreover, the hardware structures of these various processors are, more specifically, an electric circuit (circuitry) in which the circuit elements such as semiconductor elements are combined.

Each configuration and function described above can be appropriately realized by any hardware, software, or a combination thereof. For example, the present invention can be adopted to a program that causes a computer to execute the processing steps (processing procedure), a computer readable recording medium recording the program (non-transitory recording medium), or a computer on which the program can be installed.

As described above, the damage detection unit 20A can detect the fissures J1 to J5 and the peeling K1 from the captured image P, the repair method for repairing the fissures J1 to J5 and the peeling K1 can be specified, and the repair diagram generation unit 20C can accurately and efficiently generate the repair diagram A1, the repair diagram A2, and the repair diagram D1.

Second Embodiment

Hereinafter, a second embodiment of the repair diagram generation device 10 will be described. In the present embodiment, the repair quantity table and the repair cost, which are the first detection results, are generated.

Figures 10, 11:
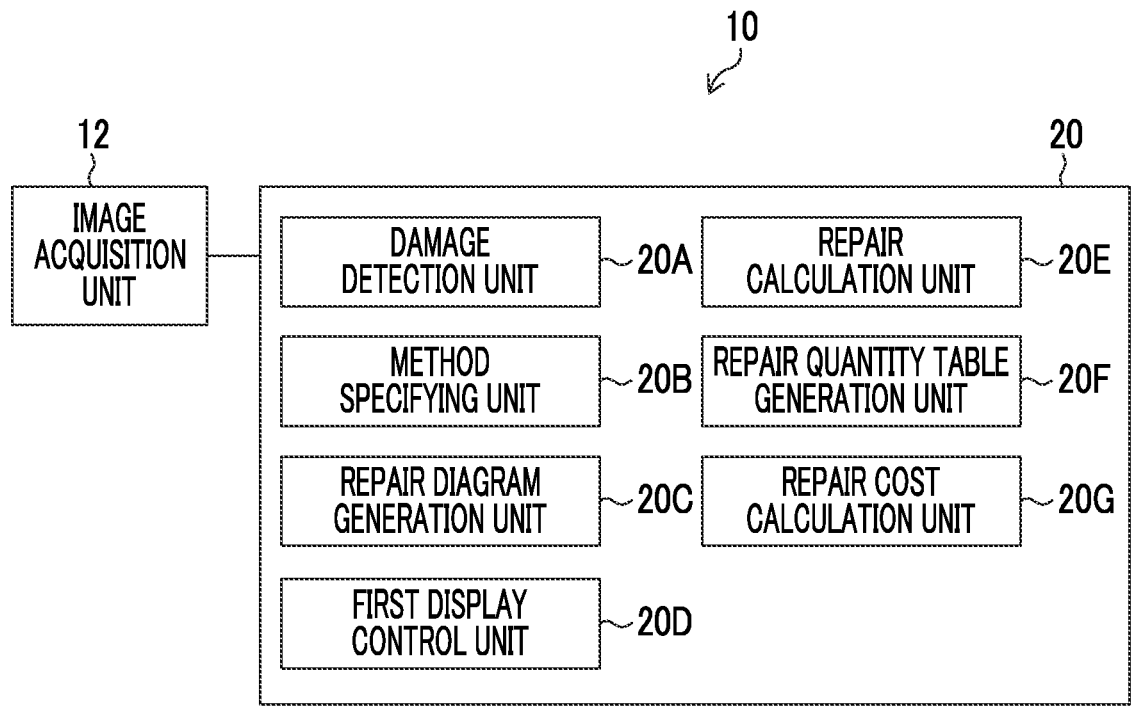
FIG. 10 is a block diagram showing the main configuration example of the repair diagram generation device.
FIG. 11 is a chart showing an example of a repair quantity table.

FIG. 10 is a block diagram showing the main configuration example of the repair diagram generation device 10 according to the present embodiment.

Note that the portions already described in FIG. 4 are designated by the same reference numerals and the description thereof will be omitted.

The repair diagram generation device 10 mainly comprises the image acquisition unit 12 and the CPU 20. The CPU 20 according to the present embodiment executes various programs stored in the storage unit 16 or the ROM 24, so that the CPU 20 functions as the damage detection unit 20A, the method specifying unit 20B, the repair diagram generation unit 20C, the first display control unit 20D, a repair calculation unit 20E, a repair quantity table generation unit 20F, and a repair cost calculation unit 20G.

The repair calculation unit 20E calculates a size of the repair region based on the repair diagram. The repair calculation unit 20E calculates a size to be actually repaired based on the repair diagram. For example, the repair calculation unit 20E calculates a width, a length, and an area of the region to be actually repaired from the width, the length, and the area of the damage diagram. For example, the repair calculation unit 20E has a relational expression between the length of the repair diagram and the length on the actual structure, and the width, the length, and the area of the region to be actually repaired is calculated from the repair diagram by using the relational expression. The relational expression is acquired by various methods. For example, the relational expression can be acquired by acquiring actual size information per pixel of the captured image P (or a panorama composition image in a case of panorama composition) or acquiring size information of a part of entire of the structure appearing in the captured image P (or the panorama composition image) and converting the acquired size information to the actual size information per pixel.

The repair quantity table generation unit 20F generates the repair quantity table including the damage repair method and the size of the repair region. Specifically, the repair quantity table generation unit 20F converts the information included in each repair diagram into text information to create a table.

FIG. 11 is a chart showing an example of the repair quantity table corresponding to the repair diagram Q.

The repair quantity table shown in FIG. 11 includes items of a repair ID, a type of the repair method, and the size of the repair region (width, length, and area), and information corresponding to each item is described for each repair portion (repair diagram). The repair ID is an individual ID added to each repair diagram. As the type of the repair method, the repair method of each repair diagram specified by the method specifying unit 20B is shown. As the size (width, length, and area), the size of the repair region calculated by the repair calculation unit 20E is shown.

Returning to FIG. 10, the repair cost calculation unit 20G calculates the damage repair cost based on the size of the repair region and the repair method. The repair cost calculation unit 20G calculates the repair cost by referring to a repair cost database stored in the storage unit 16 based on the size of the repair region and the repair method.

FIG. 12 is a diagram showing a storage configuration example of the repair cost database.

In the example shown in FIG. 12, a major repair method classification, a minor repair method classification, and a unit repair cost are stored in association with each other.

In a case in which the major repair method classification is the fissure repair method and the minor repair method classification is the fissure injection method, the repair cost is calculated at 10,000 yen/m. In a case in which the major repair method classification is the fissure repair method and the minor repair method classification is the fissure filling method, the repair cost is calculated at 25,000 yen/m. In addition, in a case in which the major repair method classification is the cross section repair method, the repair cost is 50,000 yen/m$^2$ in a case in which the minor repair method classification is the plastering method, the repair cost is 150,000 yen/m$^2$ in a case in which the minor repair method classification is the mold injection method, and the repair cost is 300,000 yen/m$^2$ in a case in which the minor repair method classification is the prepacked concrete method.

Note that the repair cost database described above is an example, and another repair cost database is also used in the present invention.

FIG. 13 is a diagram showing a modification example of the repair quantity table shown in FIG. 11.

In the modification example of the repair quantity table shown in FIG. 13 includes items of the repair ID, the type of the repair method, the size of the repair region (width, length, and area), and the repair cost, and information corresponding to each item is described for each repair portion (repair diagram). In the item of the repair cost, the repair cost corresponding to each repair diagram calculated by the repair cost calculation unit 20G is shown. In this way, the repair quantity table generation unit 20F generates the repair quantity table including the repair cost calculated by the repair cost calculation unit 20G, so that the user can confirm the repair cost corresponding to each repair diagram.

As described above, the repair quantity table is generated and displayed on the display unit 3, so that the user can confirm the repair diagram as the text information. In addition, the repair cost of each repair diagram is calculated and displayed on the display unit 3, so that the user can confirm the repair cost of each repair diagram.

Third Embodiment

Hereinafter, a third embodiment of the repair diagram generation device 10 will be described. In the present embodiment, the damage diagram and the damage quantity table, which are the second detection results, are generated.

Figure 14:
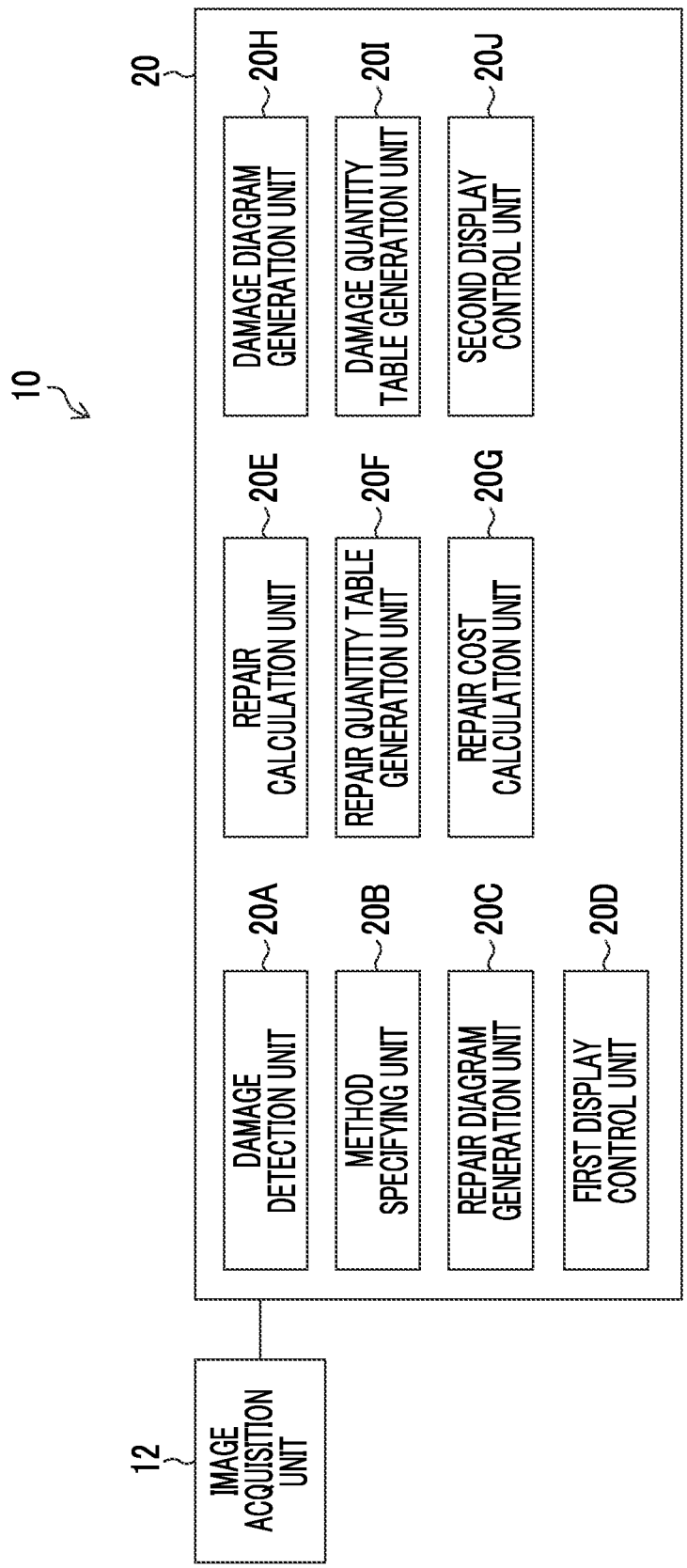
FIG. 14 is a block diagram showing a main functional configuration example of the repair diagram generation device.

FIG. 14 is a block diagram showing a main functional configuration example of the repair diagram generation device 10. Note that the portions already described in FIGS. 4 and 10 are designated by the same reference numerals and the description thereof will be omitted.

The repair diagram generation device 10 mainly comprises the image acquisition unit 12 and the CPU 20. The CPU 20 according to the present embodiment executes various programs stored in the storage unit 16 or the ROM 24, so that the CPU 20 functions as the damage detection unit 20A, the method specifying unit 20B, the repair diagram generation unit 20C, the first display control unit 20D, the repair calculation unit 20E, the repair quantity table generation unit 20F, the repair cost calculation unit 20G, a damage diagram generation unit 20H, a damage quantity table generation unit 20I, and a second display control unit 20J.

The damage diagram generation unit 20H generates the damage diagram showing the damage based on the damage detected by the damage detection unit 20A. The damage diagram generation unit 20H generates the damage diagram corresponding to the damage detected by the damage detection unit 20A by a known method. For example, the damage diagram generation unit 20H generates the damage diagram shown by a line in a case in which the damage is the fissure, and generates the damage diagram showing the outer circumference of the region of peeling by a line in a case in which the damage is the peeling. In the following, a specific example of the damage diagram generated by the damage diagram generation unit 20H will be described.

Figure 15:
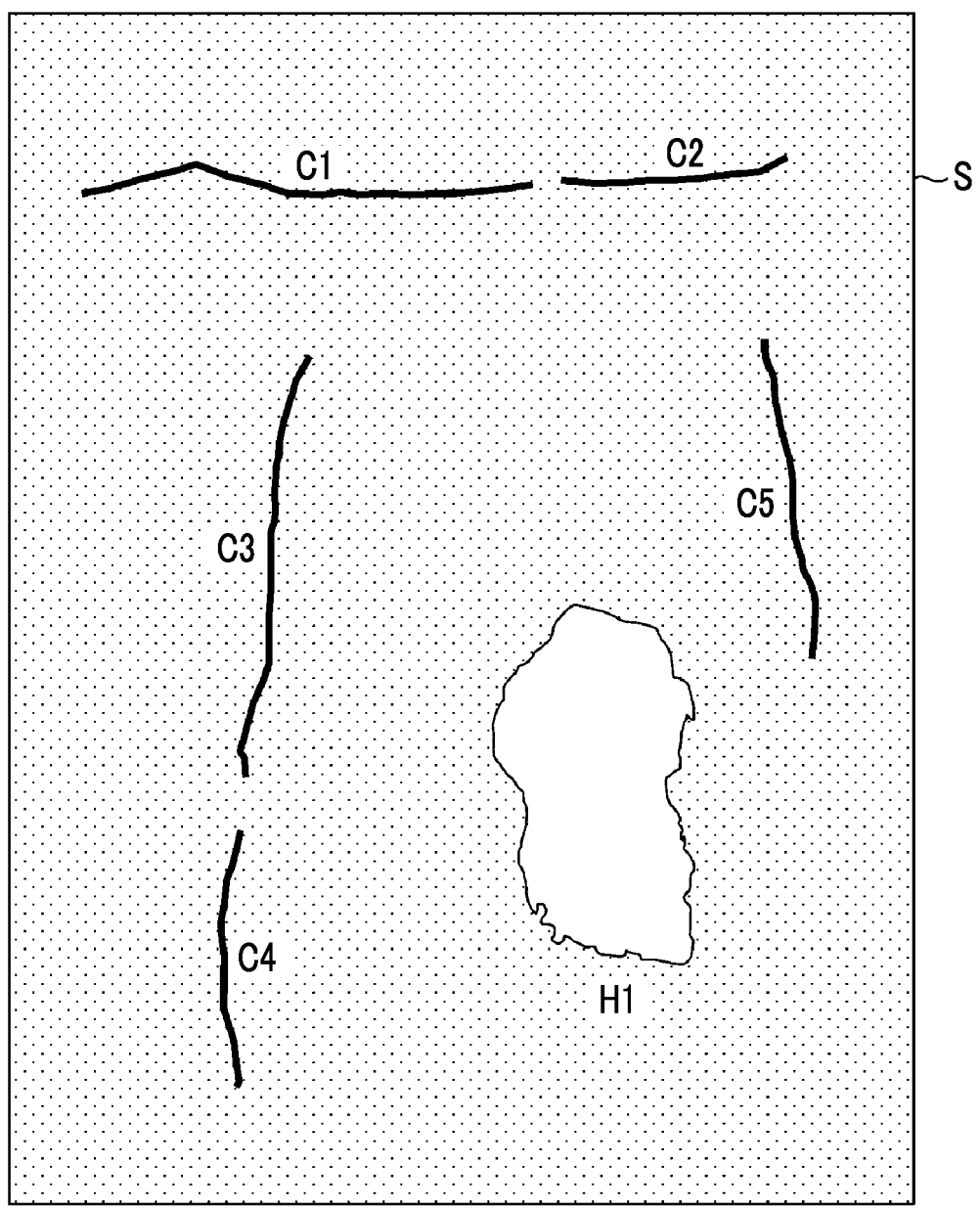
FIG. 15 is a diagram showing a damage diagram.

FIG. 15 is a diagram showing a damage diagram S generated by the damage diagram generation unit 20H based on the captured image P.

The damage diagram S corresponds to the captured image P, and includes damage diagrams C1 to C5 corresponding to the fissures J1 to J5 and a damage diagram H1 corresponding to the peeling K1. In addition, the damage diagrams C1 to C5 are shown by, for example, red lines, it is represented that the damage diagrams C1 to C5 are the damage diagrams of the fissure. In addition, the damage diagram H1 is shown by, for example, a blue line, it is represented that the damage diagram H1 is the damage diagram of the peeling.

Returning to FIG. 14, the damage quantity table generation unit 20I generates the damage quantity table including the damage and the degree of the damage.

FIG. 16 is a diagram showing the damage quantity table corresponding to the damage diagram S.

The damage quantity table shown in FIG. 16 includes items of a damage ID, the type of the damage, and the degree of the damage (size) (width, length, and area), and information corresponding to each item is described for each damage portion (damage diagram).

Returning to FIG. 14, the second display control unit 20J displays at least one of the damage diagram or the damage quantity table on the display unit 3 as the second detection result.

As described above, in the present embodiment, the damage diagram and/or the damage quantity table is generated and displayed on the display unit 3. By displaying the damage diagram on the display unit 3, the user can confirm the damage more clearly, and can create a report or the like by using the damage diagram. Moreover, the user can confirm the damage as the text information by displaying the damage quantity table on the display unit 3.

First Application Example

In the present embodiment, the repair diagram Q or the damage diagram S is displayed by superimposing the repair diagram Q or the damage diagram S on the captured image P. In the following, a specific example thereof will be described.

Figure 17:
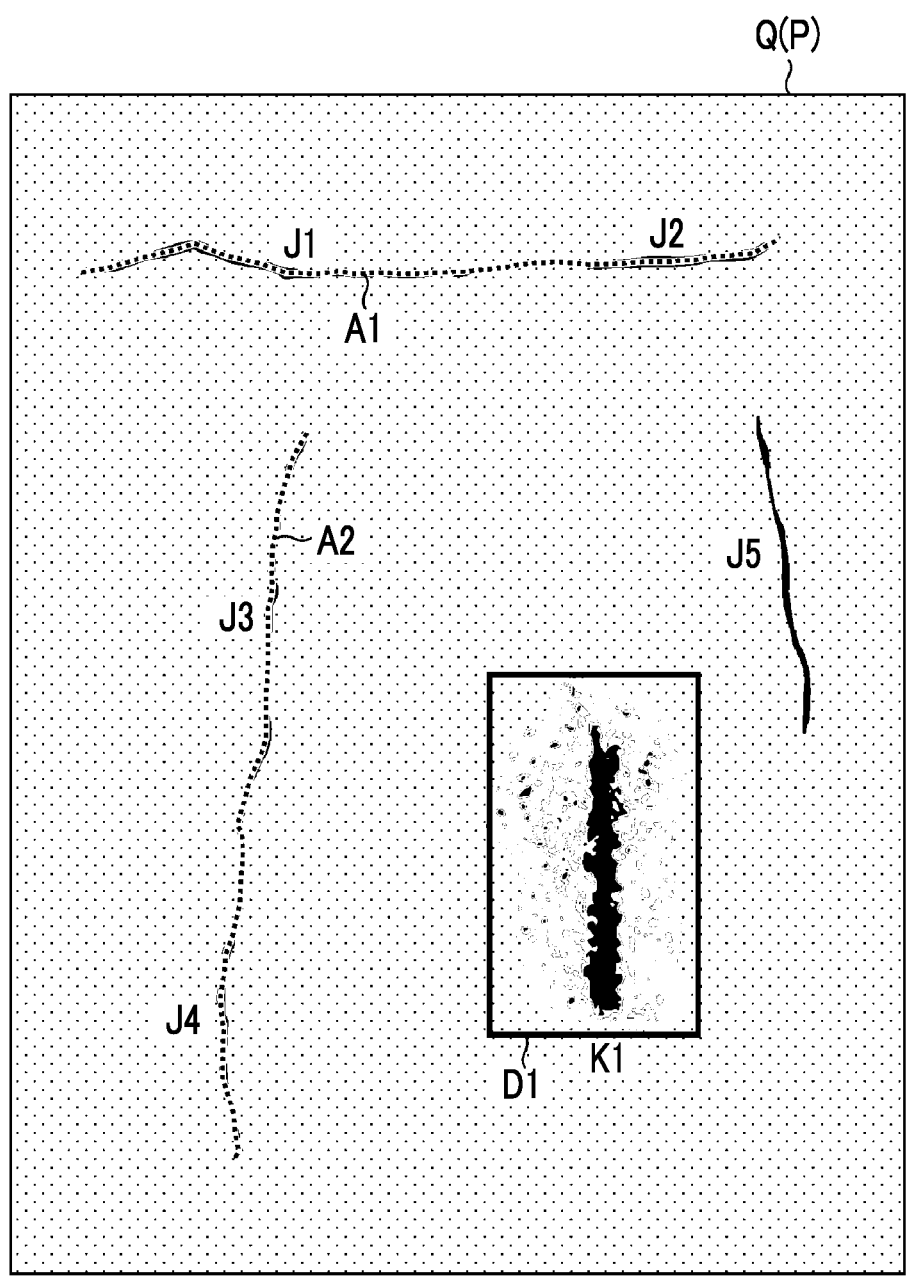
FIG. 17 shows a display example in which the repair diagram is displayed by superimposing the repair diagram on the captured image.

FIG. 17 shows a display example in which the repair diagram Q is displayed by superimposing the repair diagram Q on the captured image P. The first display control unit 20D displays the repair diagram Q by superimposing the repair diagram Q on the captured image P on the display unit 3. The first display control unit 20D displays the repair diagram A1 (shown by a dotted line) by superimposing the repair diagram A1 on the fissure J1 and the fissure J2. In addition, the first display control unit 20D displays the repair diagram A2 (shown by a dotted line) by superimposing the repair diagram A2 on the fissure J3 and the fissure J4. In addition, the first display control unit 20D displays the repair diagram D1 (shown by a solid line) by superimposing the repair diagram D1 on the peeling K1. Note that the fissure J5 is not repaired, so that no repair diagram is generated. In this way, by displaying the repair diagram generated by the repair diagram generation unit 20C by superimposing the repair diagram on the captured image P, the user can more clearly grasp a relationship between the damage and the repair diagram.

Figure 18:
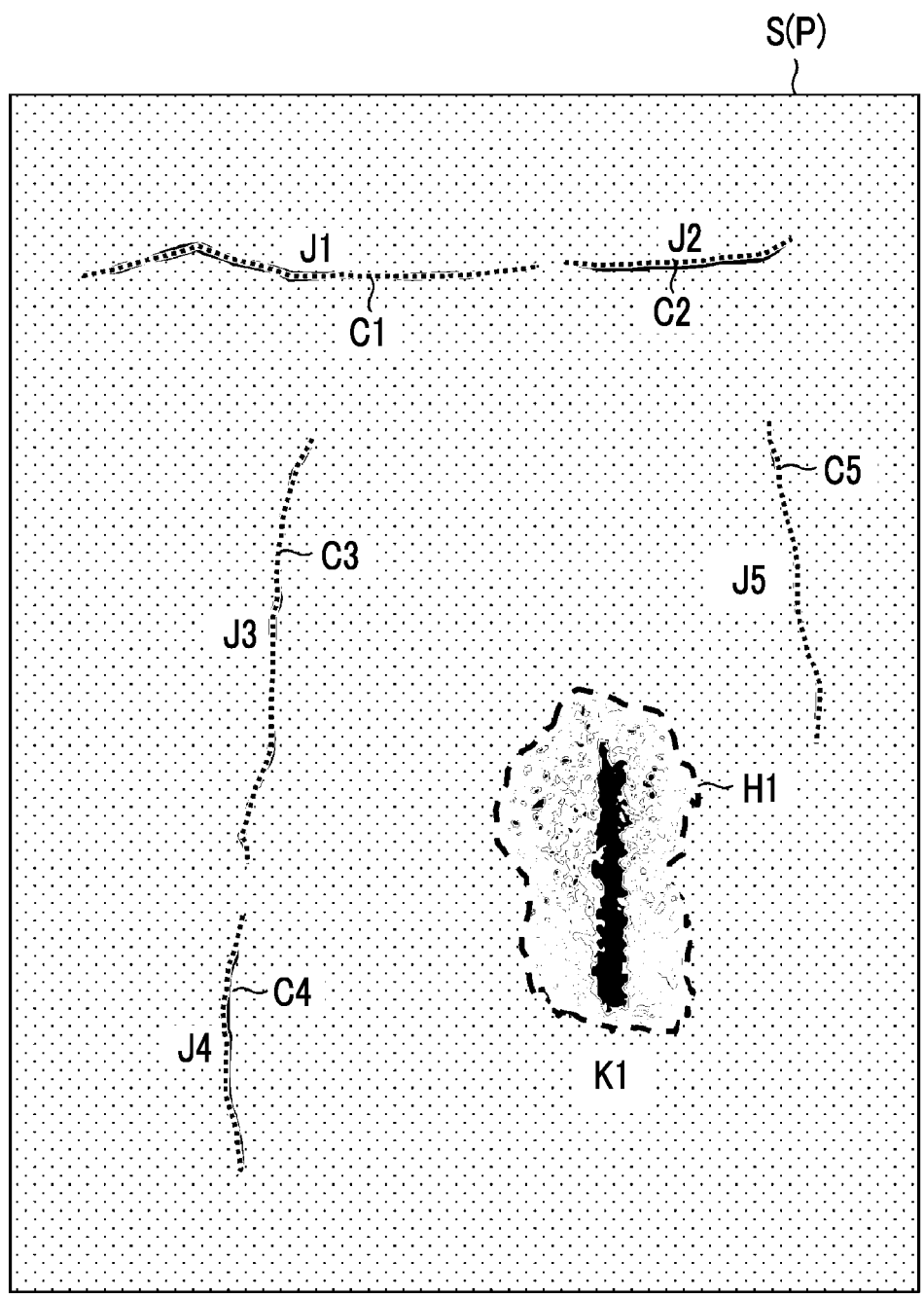
FIG. 18 shows a display example in which the damage diagram is displayed by superimposing the damage diagram on the captured image.

FIG. 18 shows a display example in which the damage diagram S is displayed by superimposing the damage diagram S on the captured image P. The second display control unit 20J displays the damage diagram S by superimposing the damage diagram S on the captured image P on the display unit 3. The second display control unit 20J displays the damage diagram C1 (shown by a dotted line) and the damage diagram C2 (shown by a dotted line) by superimposing the damage diagram C1 on the fissure J1 and the damage diagram C2 on the fissure J2. In addition, the second display control unit 20J displays the damage diagram C3 (shown by a dotted line) and the damage diagram C4 (shown by a dotted line) by superimposing the damage diagram C3 on the fissure J3 and the damage diagram C4 on the fissure J4. In addition, the second display control unit 20J displays the damage diagram C5 (shown by a dotted line) by superimposing the damage diagram C5 on the fissure J5. In addition, the first display control unit 20D displays the damage diagram H1 (shown by a dotted line) by superimposing the damage diagram H1 on the peeling K1. In this way, by displaying the damage diagram generated by the damage diagram generation unit 20H by superimposing the damage diagram on the captured image P, the user can clearly grasp a relationship between the damage and the damage diagram.

Here, as the captured image P to be superimposed and displayed as described above, a single captured image may be displayed or the panorama composition image obtained by performing panorama composition of a plurality of the captured images may be displayed by superimposing the repair diagram or the damage diagram on the panorama composition image. A panorama composition unit (not shown) is realized by the CPU 20 and performs the panorama composition of the plurality of captured images acquired by the image acquisition unit 12.

Second Application Example

In the present embodiment, the first detection result and the second detection result are displayed alternately or at the same time. For example, the repair diagram Q as the first detection result, and the damage diagram S as the second detection result are displayed alternately or at the same time. The repair diagram shows the repair region and the repair method for repairing the damage, and the damage diagram shows the damage, so that both diagrams are used for different uses. For example, the repair diagram is used for repair design and pre-repair survey. Therefore, the repair diagram is output by converting the damage detection result into the information on the repair portion or the region in accordance with the repair method such that the length or the area of a repair target can be grasped. On the other hand, the damage diagram is used for inspection, diagnosis, repair design, and pre-repair survey. Therefore, the repair diagram outputs the result of faithfully detecting the damage (fissure line or damage region) such that a degree of progress of the damage compared to the past can be grasped. In the present embodiment, the convenience to the user is improved by displaying the repair diagram and the damage diagram having different properties alternately or at the same time. Hereinafter, description will be made regarding the alternating display of the first detection result and the second detection result, and a case in which the first detection result and the second detection result are displayed side by side at the same time.

Figure 19:
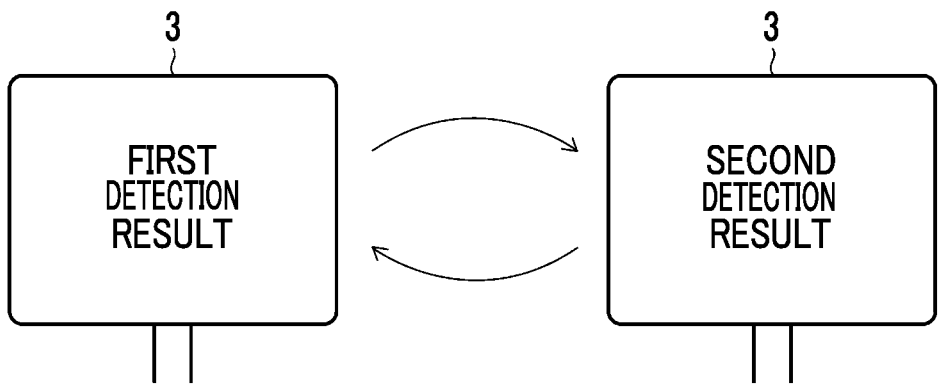
FIG. 19 is a conceptual diagram showing alternating display of a first detection result and a second detection result.

FIG. 19 is a conceptual diagram showing the alternating display of the first detection result and the second detection result.

As shown in FIG. 19, the first display control unit 20D and the second display control unit 20J switch and display the display of the first detection result and the display of the second detection result. Note that a switching timing can be adjusted as appropriate. For example, the display can be switched by an instruction for the switching timing given by the user via the operation unit 5.

Figure 20:
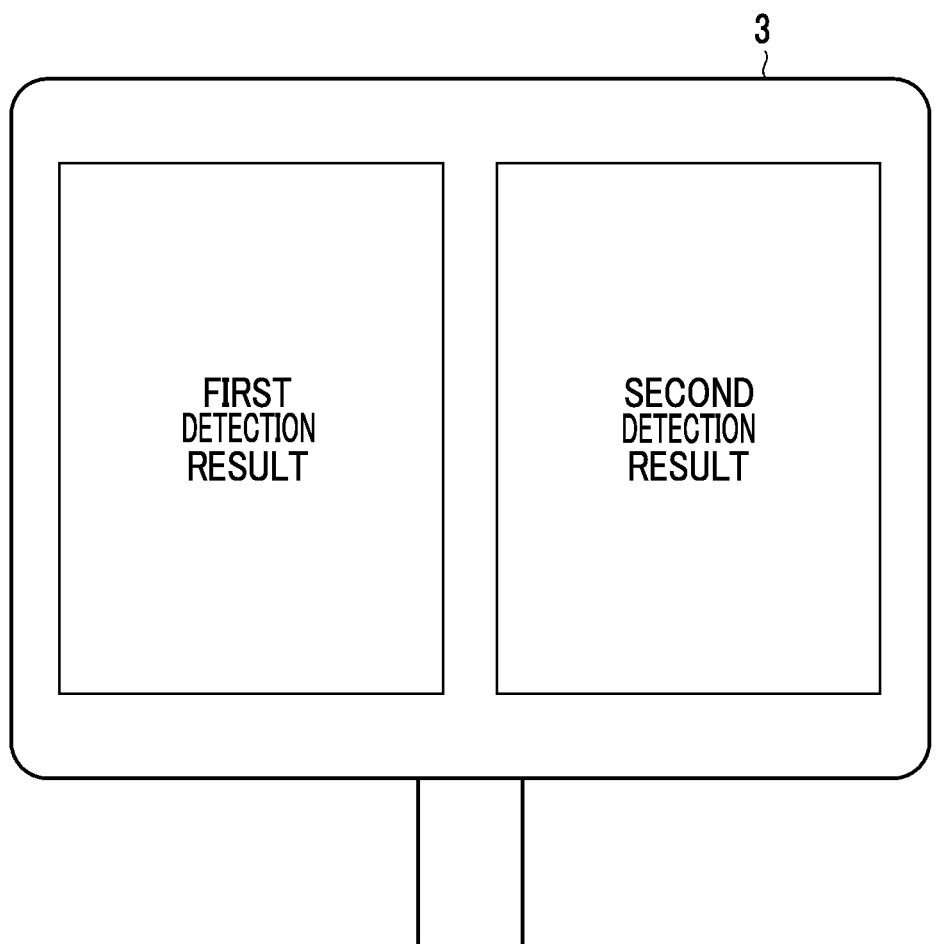
FIG. 20 is a diagram showing a case in which the first detection result and the second detection result are displayed side by side at the same time.

FIG. 20 is a diagram showing a case in which the first detection result and the second detection result are displayed side by side at the same time.

As shown in FIG. 20, the first display control unit 20D and the second display control unit 20J display the first detection result and the second detection result side by side at the same time. Note that, in FIG. 20, the first detection result and the second detection result are arranged in a horizontal direction, but the present embodiment is not limited to this. The first detection result and the second detection result may be arranged in a vertical direction.

Although the embodiments of the present invention have been described above, it is needless to say that the present invention is not limited to the embodiments described above and various modifications can be made without departing from the gist of the present invention.

From the above description, the repair diagram generation device according to Supplementary Notes 1 to 14 can be grasped.

[Supplementary Note 1]

A repair diagram generation device comprising a camera that acquires a captured image of a structure, and a processor, in which the processor detects damage from the captured image by image processing and specifies a degree of the damage, specifies a repair method of the damage based on the damage and the degree of the damage, and generates a repair diagram showing a repair region and the repair method for repairing the damage based on the damage and the repair method.

[Supplementary Note 2]

The repair diagram generation device according to Supplementary Note 1, in which in a case in which the damage is a plurality of fissures in the captured image and the plurality of fissures are close to each other by equal to or less than a threshold value, the processor generates the repair diagram by connecting the fissures close to each other.

[Supplementary Note 3]

The repair diagram generation device according to Supplementary Note 1 or 2, in which the processor generates the repair diagram by using a region larger than a shape of the damage as a repair region.

[Supplementary Note 4]

The repair diagram generation device according to any one of Supplementary Notes 1 to 3, in which the processor calculates a size of the repair region based on the repair diagram, and generates a repair quantity table including the size of the repair region.

[Supplementary Note 5]

The repair diagram generation device according to Supplementary Note 4, in which the processor calculates a repair cost of the damage based on the size of the repair region and the repair method.

[Supplementary Note 6]

The repair diagram generation device according to Supplementary Note 5, in which the processor displays at least one of the repair diagram, the repair quantity table, or the repair cost as a first detection result on a monitor.

[Supplementary Note 7]

The repair diagram generation device according to Supplementary Note 6, in which the processor generates a damage diagram showing the damage based on the damage.

[Supplementary Note 8]

The repair diagram generation device according to Supplementary Note 7, in which the processor generates a damage quantity table including the degree of the damage.

[Supplementary Note 9]

The repair diagram generation device according to Supplementary Note 8, in which the processor displays at least one of the damage diagram or the damage quantity table on the monitor as a second detection result.

[Supplementary Note 10]

The repair diagram generation device according to Supplementary Note 9, in which the processor switches and displays the first detection result and the second detection result on the monitor.

[Supplementary Note 11]

The repair diagram generation device according to Supplementary Note 9, in which the processor displays the first detection result and the second detection result side by side on the monitor at the same time.

[Supplementary Note 12]

The repair diagram generation device according to any one of Supplementary Notes 6 to 11, in which the processor receives an editing instruction for the first detection result.

[Supplementary Note 13]

The repair diagram generation device according to any one of Supplementary Notes 9 to 11, in which the processor receives an editing instruction for the second detection result.

[Supplementary Note 14]

The repair diagram generation device according to any one of Supplementary Notes 1 to 13, in which the processor performs panorama composition of a plurality of captured images acquired by the camera.

Explanation of References

1: computer
1a: computer body
3: display unit
5: operation unit
10: repair diagram generation device
12: image acquisition unit
16: storage unit
20: CPU
20A: damage detection unit
20B: method specifying unit
20C: repair diagram generation unit
20D: first display control unit
20E: repair calculation unit
20F: repair quantity table generation unit
20G: repair cost calculation unit
20H: damage diagram generation unit
20I: damage quantity table generation unit
20J: second display control unit
22: RAM
24: ROM
31: end part
33: end part
35: circumscribed rectangular region
A1: repair diagram
A2: repair diagram
C1: damage diagram
C2: damage diagram
C3: damage diagram
C4: damage diagram
C5: damage diagram
D1: repair diagram
H1: damage diagram
K1: peeling
P: captured image
Q: repair diagram
S: damage diagram

What is claimed is:

1. A repair diagram generation device comprising:
a camera that acquires a captured image of a structure; and
a processor configured to:
detect damage from the captured image by image processing and specify a degree of the damage;
specify a repair method of the damage based on the damage and the degree of the damage; and
generate a repair diagram showing a repair region and the repair method for repairing the damage based on the damage and the repair method,
wherein in a case in which the damage is a plurality of fissures in the captured image and the plurality of fissures are close to each other by equal to or less than a threshold value, the processor is configured to generate the repair diagram by connecting the fissures close to each other.

2. The repair diagram generation device according to claim 1,
wherein the processor is configured to generate the repair diagram by using a region larger than a shape of the damage as the repair region.

3. The repair diagram generation device according to claim 1,
wherein the processor is configured to calculate a size of the repair region based on the repair diagram, and generate a repair quantity table including the size of the repair region.

4. The repair diagram generation device according to claim 3,
wherein the processor is configured to calculate a repair cost of the damage based on the size of the repair region and the repair method.

5. The repair diagram generation device according to claim 4,
wherein the processor is configured to display at least one of the repair diagram, the repair quantity table, or the repair cost as a first detection result on a monitor.

6. The repair diagram generation device according to claim 5,
wherein the processor is configured to generate a damage diagram showing the damage based on the damage.

7. The repair diagram generation device according to claim 6,
wherein the processor is configured to generate a damage quantity table including the degree of the damage.

8. The repair diagram generation device according to claim 7,
wherein the processor is configured to display at least one of the damage diagram or the damage quantity table on the monitor as a second detection result.

9. The repair diagram generation device according to claim 8, wherein the processor is configured to switch and display the first detection result and the second detection result on the monitor.

10. The repair diagram generation device according to claim 8,
wherein the processor is configured to display the first detection result and the second detection result side by side on the monitor at the same time.

11. The repair diagram generation device according to claim 5,
wherein the processor is configured to receive an editing instruction for the first detection result.

12. The repair diagram generation device according to claim 8,
wherein the processor is configured to receive an editing instruction for the second detection result.

13. The repair diagram generation device according to claim 1,
wherein the camera acquires a plurality of captured images of the structure, and
wherein the processor is configured to perform panorama composition of the plurality of the captured images acquired by the camera.

14. A repair diagram generation method comprising:
acquiring a captured image of a structure;
detecting damage from the captured image by image processing and specifying a degree of the damage;
specifying a repair method of the damage based on the damage and the degree of the damage; and
generating a repair diagram showing a repair region and the repair method for repairing the damage based on the damage and the repair method,
wherein in a case in which the damage is a plurality of fissures in the captured image and the plurality of fissures are close to each other by equal to or less than a threshold value, the method includes generating the repair diagram by connecting the fissures close to each other.

15. A non-transitory computer readable recording medium storing a program causing a computer to execute a repair diagram generation process comprising:
acquiring a captured image of a structure;
detecting damage from the captured image by image processing and specifying a degree of the damage;
specifying a repair method of the damage based on the damage and the degree of the damage; and
generating a repair diagram showing a repair region and the repair method for repairing the damage based on the damage and the repair method,
wherein in a case in which the damage is a plurality of fissures in the captured image and the plurality of fissures are close to each other by equal to or less than a threshold value, the program further causes the computer to execute generating the repair diagram by connecting the fissures close to each other.

* * * * *